(12) United States Patent
Erdei et al.

(10) Patent No.: US 12,099,010 B2
(45) Date of Patent: Sep. 24, 2024

(54) USER INTERFACE FOR A FLUORESCENCE ASSAY

(71) Applicant: Luminex Corporation, Austin, TX (US)

(72) Inventors: Alpar Erdei, Pflugerville, TX (US); Joshua Lelan Callaway, Austn, TX (US); Terrence Lee Hodge, Austin, TX (US)

(73) Assignee: Luminex Corporation, Austin, TX (US)

( * ) Notice: Subject to any disclaimer, the term of this patent is extended or adjusted under 35 U.S.C. 154(b) by 430 days.

(21) Appl. No.: 17/369,744

(22) Filed: Jul. 7, 2021

(65) Prior Publication Data

US 2022/0011230 A1 Jan. 13, 2022

Related U.S. Application Data

(60) Provisional application No. 63/049,504, filed on Jul. 8, 2020.

(51) Int. Cl.
*G01N 21/64* (2006.01)
*G01N 35/00* (2006.01)

(52) U.S. Cl.
CPC . *G01N 21/6428* (2013.01); *G01N 2021/6419* (2013.01); *G01N 2021/6421* (2013.01); *G01N 2021/6423* (2013.01); *G01N 2035/00891* (2013.01); *G01N 2035/0091* (2013.01)

(58) Field of Classification Search
USPC .......................................................... 702/32
See application file for complete search history.

(56) References Cited

U.S. PATENT DOCUMENTS

| 6,139,800 A | 10/2000 | Chandler |
| 9,568,423 B2* | 2/2017 | Li ....................... G01N 15/1434 |
| 2011/0204259 A1* | 8/2011 | Rogers ............... G01N 15/1429 |
| | | 250/459.1 |
| 2012/0220022 A1 | 8/2012 | Ehrlich et al. |
| 2013/0145299 A1 | 6/2013 | Steimle et al. |
| 2013/0327671 A1 | 12/2013 | Ciurczak et al. |

(Continued)

OTHER PUBLICATIONS

International Search Report and Written Opinion in PCT Appl. No. PCT/US2021/040433 mailed Oct. 13, 2021, 17 pages.

(Continued)

*Primary Examiner* — Paul D Lee
(74) *Attorney, Agent, or Firm* — Kowert, Hood, Munyon, Rankin & Goetzel, P.C.; Dean M. Munyon

(57) ABSTRACT

A fluorescence assay device performs a fluorescence assay of one or more samples including fluorescent materials, causing a plurality of sets of datapoint to be stored relating to received fluorescence emitted by the fluorescent materials. A user interface displays representations of some of the sets of datapoints. A first region of the user interface includes alphanumeric representations of a subset of the plurality of sets of datapoints, including one or more user-specified sets of datapoints. A second region of the user interface includes one or more pictographic representations of the one or more user-selected sets of datapoints. The one or more pictographic representations indicate categorizations of values of the particular set of datapoints for the one or more samples.

20 Claims, 8 Drawing Sheets

(56) References Cited

U.S. PATENT DOCUMENTS

| | | |
|---|---|---|
| 2014/0057255 A1 | 2/2014 | Holmes |
| 2016/0063181 A1 | 3/2016 | Subramaniam et al. |
| 2018/0180537 A1 | 6/2018 | Diem et al. |
| 2018/0356331 A1* | 12/2018 | Roberts ................. G06F 16/907 |

OTHER PUBLICATIONS

International Preliminary Report in PCT Appl. No. PCT/US2021/040433 mailed Jan. 19, 2023, 11 pages.
Extended European Search Report in Appln. No. 21837751.3 mailed Jul. 12, 2024, 11 pages.

* cited by examiner

FIG. 4

USER INTERFACE FOR A FLUORESCENCE ASSAY

CROSS-REFERENCE TO RELATED APPLICATION

The present application claims the benefit of U.S. Provisional Appl. No. 63/049,504 filed on Jul. 8, 2020; which is incorporated by reference herein in its entirety.

BACKGROUND

Technical Field

This disclosure relates generally to user interfaces, in particular user interfaces for a fluorescence assay device.

Description of the Related Art

In various types of assays, fluorescence assay device performs the assay on a sample and generates data to be analyzed to, for example, detect one or more target sequences of genetic material in the sample. Users working in a laboratory can load a sample into the fluorescence assay device, and then using a user interface such as a touch screen display can initiate, monitor, and control the fluorescence assay device to ensure that the assay is performed and to observe the results. In various instances such a user interface is implemented with a display that is integrated with the fluorescence assay device or coupled to the fluorescence assay device as a separate display monitor.

BRIEF DESCRIPTION OF THE DRAWINGS

FIG. 4 is an example of an implementation of the user interface of FIG. 1 in accordance with various embodiments.

Figure 1:
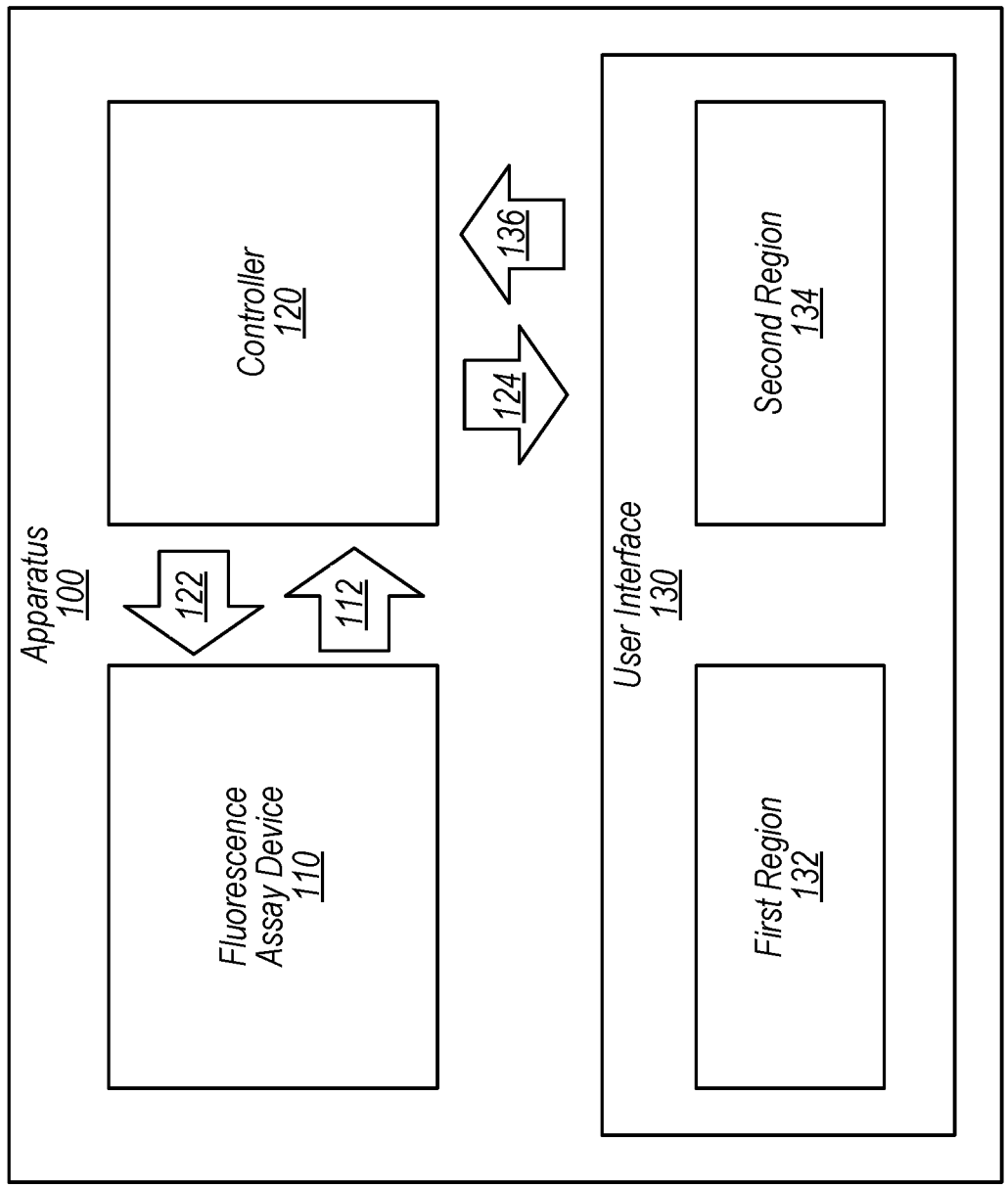
FIG. 1 is a block diagram illustrating an embodiment of an apparatus configured to perform a fluorescence assay and present a user interface.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to perform a fluorescence assay" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" sample would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "platform" refers to an environment that includes a set of resources that enables some functionality (for example, in the context of the present disclosure, controlling a fluorescence assay device and a user interface). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules" are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, an automated decision-making platform according to the present disclosure provides resources for performing automated decision making; users may utilize the platform to carry out instances of automated decision making. Embodiments of the automated decision-making platform described herein thus enable the functionality of automated decision making to be performed.

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

Fluorescence assays gather voluminous amounts of information during the performance of an assay on sample. This amount of information is further increased in a multiplexing assay on a sample in which a particular sample has been treated to detect multiple target analytes (e.g., to scan for different viruses on a standard respiratory virus panel). Further still, a single receptacle may have many different samples (e.g., a microplate having dozens or hundreds of samples) that are individually subjected to a multiplex assay. In various fluorescence assay devices, multiple light sources (e.g., a red laser, a green laser, and a violet laser) are used to detect target fluorophores and also to distinguish between different groups of test particles (e.g., different groups of beads that have been internally dyed with different ratios of two, three, or more different fluorophores that can be distinguished based on different fluorescence emissions profiles). Fluorescence assay devices may also use multiple photosensors in different locations to measure direct emissions, side-scatter, and other light sources in the test areas. After photosensor readings are recorded, fluorescence assay devices may perform data processing (e.g., calculating various statistical measurements such as median, coefficient of variation, standard deviations) on a per-bead, per-well, and/or per-receptacle basis. Advances in microprocessors and photosensors have also led to increased sampling rates and light sensitivity. Accordingly, as an assay is performed on a particular sample (or receptacle including multiple samples), potentially millions of datapoints may be collected.

As fluorescence assays have increased the amount of data that is collected, improvements in fluorescence assay devices have also enabled the devices that gather such information to be miniaturized to the point that fluorescence assay devices capable of performing multiplex-assays can fit on a desk. In various instances, such fluorescence assay devices may have integrated displays that are sized to fit the fluorescence assay device. Accordingly, in various instances as the amount of information collected in a such fluorescence assay has increased as the size of the integrated display on the fluorescence assay device has decreased.

Moreover, fluorescence assay devices may be used to conduct innumerable experiments devised by scientists and technicians. A particular set of values for a set of datapoints in Experiment A targeting different sequences for respiratory viruses may not be as meaningful for Experiment B targeting sequences for herpesviruses. A particular value during Experiment A may require intervention to ensure the usefulness of the experiment, especially if an experiment is conducted over a period of days, weeks, or months. Accordingly, being able to identity issues and act to address them may prevent having to repeat or redo assays.

The present disclosure recognizes that a user interface for information gathered during a fluorescence assay should be flexible to allow a user to determine which of potentially millions of datapoints to display on limited display area. Further, flexible and configurable pictographic representations of important values for a particular experiment may enable a user to recognize an issue from across the lab and take appropriate actions. Because different experiments have different experimental thresholds, such pictographic representations should be configurable by the user to enable limited display area to display meaningful and actionable information for the particular experiment.

Referring now to FIG. 1, a block diagram is shown illustrating an embodiment of an apparatus 100 configured to perform a fluorescence assay and present a user interface. In various embodiments, apparatus 100 includes a fluorescence assay device 110, a controller 120, and a user interface 130. While only one fluorescence assay device 110, one controller 120, and one user interface 130 are shown in FIG. 1, it will be understood that more than one of each may be present in various other embodiments. In various embodiments, fluorescence assay device 110, controller 120, and user interface 130 may be integrated into a single apparatus (as shown below in reference to FIG. 5). In other embodiments, however, these components may be implemented separately (e.g., a fluorescence assay device 110 that communicates with a desktop computer system implementing controller 120 that communicates with a display touchscreen monitor that implements user interface 130) and work together to implement the functionality discussed herein Fluorescence assay device 110 is any of a number of assay devices (e.g., a PCR assay device or a flow cytometer) that is operable to perform an assay on one or more samples using one or more light sources that cause fluorescent particles in the one or more samples to emit fluorescence. As discussed herein, this fluorescence can be measured and analyzed. In various embodiments, fluorescence assay device 110 includes a sample receiver configured to hold a receptable including one or more samples (e.g., a 96-well microplate, a 384-well microplate). As discussed herein, the sample includes particles having a plurality of fluorescent materials (e.g., fluorescently labelled cells, or microspheres internally dyed with 1 fluorophore or a ratio of 2, 3, or 4 fluorophores and that have been treated to bond with a target analyte and an exterior fluorophore). In various embodiments, fluorescence assay device 110 includes a plurality of light sources configured to illuminate the sample (e.g., a red laser, a green laser, and a violet laser). Fluorescence assay device 110 includes one or more photosensors configured to receive fluorescence emitted by the fluorescent materials. Such photosensors are configured to measure the received fluorescence and send the resulting measurements to controller 120 as measured fluorescence data 112. Fluorescence assay device 110 is discussed in further detail herein in reference to FIG. 2.

Controller 120 is operable to receive input from fluorescence assay device 110 and user interface 130, perform various processing functions on the received input as discussed herein, and send output to fluorescence assay device 110 and user interface 130. Controller 120 is implemented by one or more computer systems. Controller 120 is operable to receive measured fluorescence data 112 from fluorescence assay device 110. Controller 120 is operable to receive user input 136 from user interface 130. Controller 120 is operable to control fluorescence assay device 110 (e.g., to cause the various components of fluorescence assay device 110 to flow a sample through an examination area, illuminate the sample with light sources, and to measure fluorescence emitted by particles in the sample) with fluorescence assay device control information 122. Controller 120 is operable to send user interface information 124 to user interface 130 for display. In some embodiments, user interface information 124 is a visual output stream that is displayed by user interface 130, but in other embodiments user interface information 124 includes information that the user interface 130 (e.g., with a computer processor circuit (not shown)) uses to generate the visual display itself. Controller 120 is discussed in further detail herein in reference to FIG. 3.

User interface 130 is operable to present information to a user and to receive information from the user. In various embodiments, user interface 130 is implemented with a touchscreen that is operable to display user interface information 124 in a plurality of regions and to receive user commands. User interface 130 is not merely limited to a touchscreen interface and, in various embodiments, may be implemented with any number of user interface devices including but not limited to visual interfaces (e.g., a display, a touch screen, a printer), audio interfaces (e.g., a speaker, a microphone), and tactical interfaces (e.g., a keyboard, a pointing device, a refreshable braille display). In various embodiments, user interface 130 presents information in a plurality of regions including but not limited to a first region 132 and a second region 134.

In various embodiments, first region 132 is operable to display alphanumeric representations of one or more sets of datapoints for the one or more samples, including a particular set of datapoints. As discussed herein, in various embodiments, the one or more sets of datapoints represented in first region 132 is a subset of datapoints relating to the sample (e.g., a subset of the list of datapoints in Table 1 herein). In various embodiments, first region 132 is operable to display alphanumeric representations of sets of datapoint from an ongoing fluorescence assay. In various embodiments, one or more particular sets of datapoints is user-specified (e.g., by a user selection on a touchscreen of a set of datapoints), and an indication of this user selection is sent to controller 120 as user input 136.

In various embodiments, second region 134 is operable to display pictographic representations that indicate categorizations of values of one or more particular sets of datapoints for the one or more samples (e.g., particular sets of datapoints that were user-selected with first region 132). In various embodiments, second region 134 is operable to display such pictographic representations of sets of datapoints from an ongoing fluorescence assay. As discussed herein, such pictographic representations may represent different categorizations through the use of different shapes and/or colors, for example. In various embodiments, the pictographic representations are selected according to user-specified categorization criteria (e.g., a value<20 is represented with a red circle, a value between 20 and 40 is represented with a green square, and value above 40 is represented with a blue triangle). In some embodiments, second region 134 is operable to display a plurality of pictographic representations (e.g., a plurality of graphs, a plurality of dot plots). In some of such embodiments, second region 134 includes a pictographic representation control (e.g., via a user selection or gesture on second region 134) useable by a user to select which of the plurality of pictographic representations is displayed in second region 134.

In some embodiments, user interface 130 is operable to receive from the user one or more commands (e.g., user input 136) that adjust performance of the fluorescence assay being performed. For example, as discussed in further detail in reference to FIG. 4, the pictographic representations displayed in second region 134 and/or the alphanumeric representations displayed in first region 132 may serve to alert a user of an issue with an ongoing assay, and the one or more commands may be to pause the assay (e.g., to allow an off-instrument process to be performed on the sample, to perform maintenance on fluorescence assay device 110) and/or to adjust controller 120 (e.g., by adjusting acquisition parameters for fluorescence assay device 110). User interface 130, first region 132, and second region 134 are discussed in further detail herein in reference to FIG. 4.

In various embodiments, user interface 130 is also operable to display tabular alphanumeric representations of previously-performed fluorescence assays of previous samples (also referred to herein as a "historical run" display). In such embodiments, for example, such tabular alphanumeric representations may use a similar format to the table displayed in first region 132. In embodiments in which samples are contained in multi-well receptacles, such tabular alphanumeric representations may include information about the receptacle (e.g., per-receptacle data 312 shown in FIG. 3) in addition to information about the individual containers for individual samples (e.g., per-well data 314 shown in FIG. 3) and information about individual assay targets (e.g., per-analyte data 316 shown in FIG. 3). In various embodiments, a historical run display may also include a plurality of pictographic representations such as those shown in second region 134. In various embodiments, the historical run display is useable to receive one or more filtering thresholds for the plurality of datapoints and/or metadata shown in the displayed tabular alphanumeric representation and based on the one or more filtering thresholds, display, on the display, a filtered tabular representation of the results (e.g., excluding results above a certain threshold). In various embodiments, the historical run display is useable to receive a selection of datapoints and metadata to prepare for export to a remote computer system (e.g., a central server in a laboratory, a user's laptop computer). As discussed herein, because the volume of datapoints collected for a sample may be vast, allowing a user to filter and export a selected portion of the datapoints may speed up the process (e.g., by requiring less processing to prepare the datapoints for export) and/or improve user experience by removing irrelevant data from the export and subsequent view of exported data. It will be understood, however, that a user does not necessarily need to input filtering thresholds prior to selecting data for export, and in various instances, may input filtering thresholds for a plurality of datapoints but select and export different datapoints for export.

Thus, in various embodiments, controller 120 is operable to cause fluorescence assay device 110 to perform a fluorescence assay of the one or more samples. In such embodiments, controller 120 receives measured fluorescence data 112 and stores the received data as datapoints (e.g., in datastore 310 shown in FIG. 3). In these embodiments, controller 120 is operable to cause a first region 132 and second region 134 to be displayed on user interface 130. As discussed herein, controller 120 causes alphanumeric representations of one or more sets of these stored datapoints, including a particular set of user-specified datapoints, to be displayed in first region 132 and pictographic representations that indicate categorizations of values of the particular set of datapoints for the one or more samples to be displayed in second region 134.

Accordingly, apparatus 100 is operable to give a user a high degree of flexibility in determining what information is shown on user-interface when a fluorescence assay is ongoing as well as when evaluating previously-performed assays. Additionally, the user is given flexibility to select particular datapoints to be represented pictographically to facilitate monitoring at a glance from across the lab to determine whether an experiment is proceeding as expected or if an issue should be addressed. Rather than merely assuming from the outset which datapoints and which thresholds may be important to a particular experiment, the disclosed techniques provide the user with the flexibility to select the most relevant datapoints and the most useful threshold to put in place.

Figure 2:
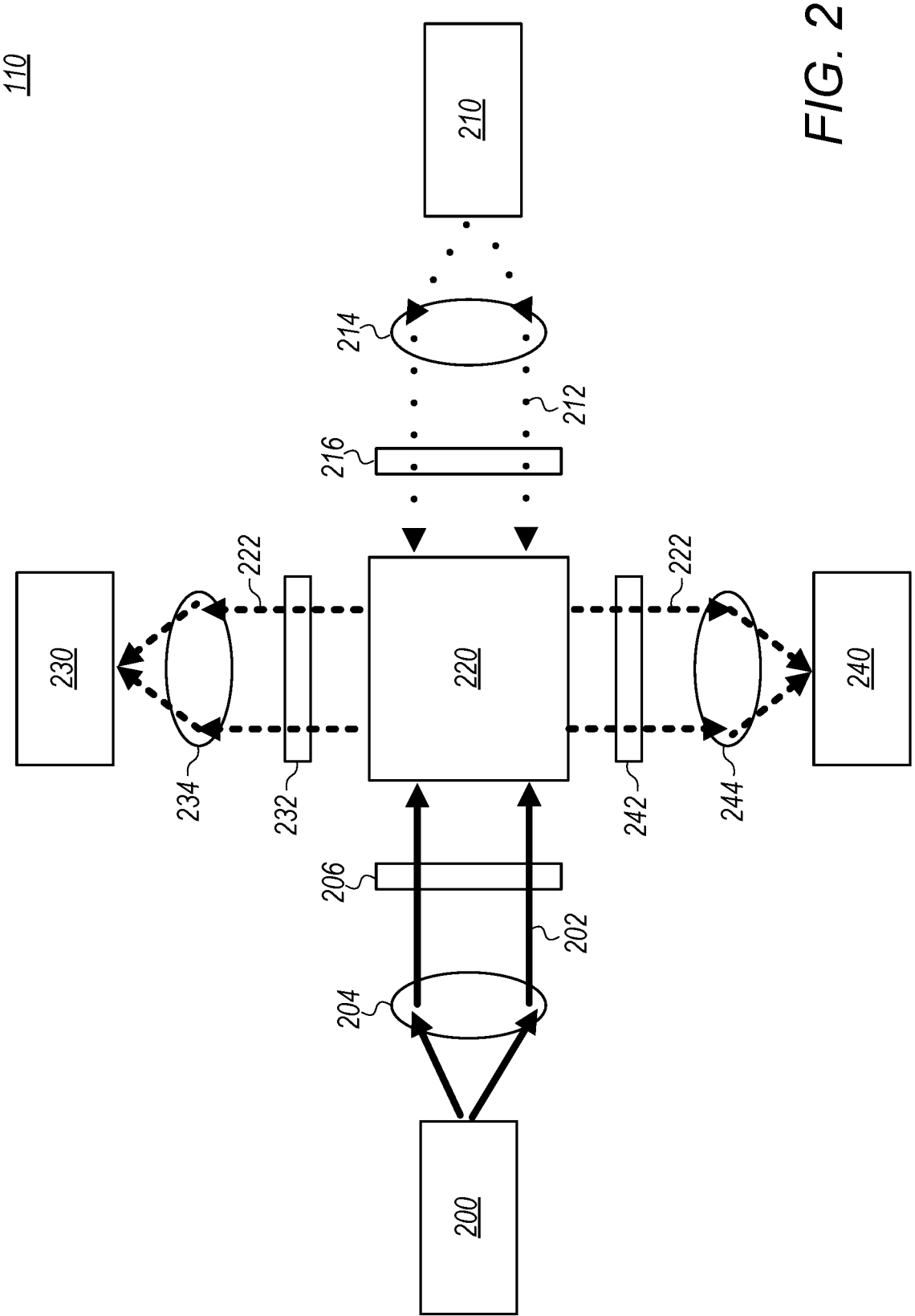
FIG. 2 is an expanded block diagram of the fluorescence assay device of FIG. 1 in accordance with various embodiments.

Referring now to FIG. 2, an expanded block diagram of fluorescence assay device 110 is shown in accordance with various embodiments. In various embodiments, fluorescence assay device 110 is a flow cytometer. This disclosure is of course not limited to flow cytometers, but FIG. 2 is provided to give context for one exemplary embodiment. In the illustrated embodiment, this system includes one or more light sources (e.g., first light source 200, second light source 210), a capillary tube 220, and one or more detectors (e.g., first detector 230, second detector 240). In various embodiments, the system includes lenses (e.g., first input lens 204, second input lens 214, first output lens 234, second output lens 244) and filters (e.g., first input filter 206, second input filter 216, first output filter 232, second output filter 242). While FIG. 2 includes two light sources 200, 210 and two detectors 230, 240, it will be understood that any number of light sources (e.g., three, four light sources) and detectors (e.g., two, four, six, seven detectors) may be present in various embodiments.

Many embodiments of flow cytometry devices are well-known in the art, and this disclosure may find applicability in any suitable system. In addition, this disclosure may be used in conjunction with other assaying systems and devices, such as flow imaging microscopes, PCR systems (including digital PCR systems), etc.

The illumination from first light source 200 and second light source 210 may be focused or collimated by input lenses 204 and 214 and wavelength-filtered by input filter 206 and 216, respectively. In some embodiments, either or both light sources 200, 210 may be a broad-spectrum source (e.g., white light), with wavelength selectivity provided by input filters 206, 216. In other embodiments, however, either or both light sources 200, 210 may themselves be narrow-spectrum (e.g., an LED or laser light source). In these embodiments, it may be possible to omit input filter 206, 216. In various embodiments, first light 202 and second light 212 are lasers. In some of such embodiments, first light 202 has a first wavelength (e.g., a red laser) and second light 212 has a second wavelength (e.g., a green laser). In various embodiments, a third light source (not shown) emits a third light source (not shown). In some of such embodiments, this third light source is a laser having a third wavelength (e.g., a violet laser).

During the flow of particles in capillary tube 220, fluorescent light 222 emitted by the various fluorescent species within capillary tube 220 may be captured by detectors 230 and 240. In some embodiments, the fluorescent light 222 may first be wavelength-filtered at output filters 232, 242 and/or focused at output lenses 234, 244 before being detected at detectors 230, 240 respectively. Detectors 230 and 240 may be any suitable light detector, such as a photo-detector, charge-coupled device (CCD) detector, photomultiplier tube, etc. In various embodiments, detectors 230 and 240 may be disposed in different positions and at any number of different angles to collect fluorescent light 222 emitted in various directions. The various measurements taken by detectors 230, 240 are output to controller 120 as measured fluorescence data 112.

In the flow cytometry system shown in FIG. 2, light sources 200 and 210 provide illumination to excite various fluorescent species (e.g., fluorophores) within capillary tube 220. Any of a number of fluorophores may be used. Further, because different fluorescent materials are excited by difference frequencies of light and because, as discussed herein, the sample may include particles with multiple types of different fluorescent materials (e.g., different fluorescent dyes, different fluorophores), first light source 200 may illuminate and excite a first fluorescent material and second light source 210 may illuminate and excite a second, different fluorescent material. Additionally, in various embodiments, a first fluorescent material, when excited, emits fluorescent emissions 222 at a first wavelength and a second fluorescent material, when excited, emits fluorescent emissions 222 at a second wavelength. For example, in some embodiments, first light source 200 illuminates a sample with red light in PCR tube 220 and a first fluorescent material in the sample emits fluorescent emissions 222 in a first wavelength (e.g., in the dark red-infrared part of the spectrum) and second light source 210 illuminates the sample with green light in PCR tube 220 and a first fluorescent material in the sample emits first fluorescent emissions 222 in a second wavelength (e.g., in the yellow-orange part of the spectrum).

In various embodiments, the sample used in connection with fluorescence assay device 110 includes a fluid suspension of one or more particles where at least some of the particles include fluorescent material. As described in U.S. Pat. Nos. 5,747,349 and 6,266,354, each incorporated herein by reference, in various embodiments the sample used in connection with fluorescence assay device 110 includes fluorescent microspheres, which are beads impregnated with a fluorescent dye. Such microspheres (also referred to herein as "beads") may include microparticles, beads, polystyrene beads, microbeads, latex particles, latex beads, fluorescent beads, fluorescent particles, colored particles and colored beads. In various embodiments, the microspheres serve as vehicles for molecular reactions. In various embodiments, microspheres or beads range in diameter from 10 nanometers to 100 microns and are uniform and highly spherical. Microspheres for use in flow cytometry may be obtained from manufacturers, such as Luminex Corp. of Austin, TX. In some of such embodiments, surfaces of the microspheres are coated with a tag that is attracted to a receptor on a cell, an antigen, an antibody, or the like in the sample fluid. So, the microspheres, having fluorescent dyes, bind specifically to cellular constituents. In various embodiments, two or more dyes are used simultaneously, each dye being responsible for detecting a specific condition. In various instances, the microspheres are also internally dyed with one or more fluorophores. Different groups of beads (also referred to herein as "bead regions") are defined by having identifiable fluorescence parameters characterized by different amounts of emissions of different wavelengths of fluorescence when exposed to a light source. For example, bead region [1] might have ratios of 33.3% fluorophore A, 33.3% fluorophore B, and 33% fluorophore C and bead region [50] might have ratios of 25% fluorophore A, 10% fluorophore B, and 65% fluorophore C. Fluorescent emissions 222 from bead region [1] and bead region [50] would be expected to have intensities and wavelengths that correspond to these ratios. Thus, the light sources 200, 210 excite the fluorescent dye(s), causing the fluorescent dye(s) to emit light that can be detected by detectors 230, 240. In various embodiments, a sample includes a plurality of such microspheres that are passed through an examination zone (e.g., capillary tube 220) one-at-time, are illuminated, and the resulting fluorescence is measured for the individual microspheres.

In various embodiments, a fluorescence assay performed by fluorescence assay device 110 includes a multiplex assay for the detection of a plurality of analytes in the one or more samples In such embodiments, the particles include a plurality of groups of particles (e.g., bead regions) and particles in individual ones of the groups of particles have (i) one or more characteristic fluorescence parameters that distinguish the particles of one of the groups of particles from those of another of the groups of particles, and (ii) a reactant specific for an analyte from among the plurality of analytes. In such embodiments, fluorescence assay device 110 is operable to collect measured fluorescence data 112 that is useable by controller 120 to distinguish between the various bead regions and to measure the presence (and in some embodiments a concentration) of the target analytes associated with the various bead regions.

Figure 3:
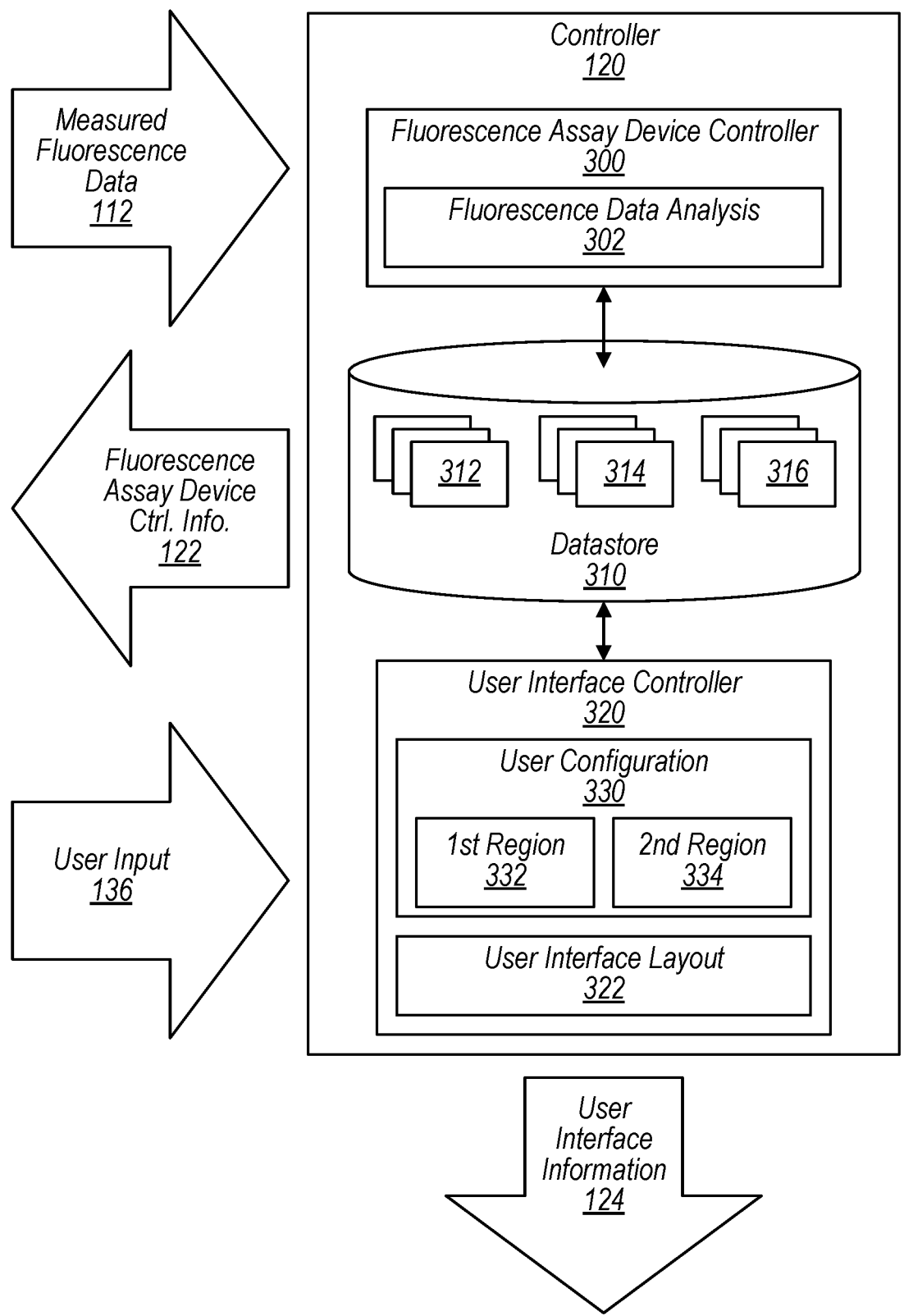
FIG. 3 is an expanded block diagram of the controller of FIG. 1 in accordance with various embodiments.

Referring now to FIG. 3, an expanded block diagram of controller 120 is shown in accordance with various embodiments. In the embodiment shown, controller 120 includes a fluorescence assay device controller 300, a datastore 310, and a user interface controller 320. While only one fluorescence assay device controller 300, one datastore 310, and one user interface controller 320 are shown in FIG. 3, it will be understood that more than one of each may be present in various other embodiments. In various embodiments, controller 120 is implemented as a platform operable to manage the functions of the various components of apparatus 100. In some of such embodiments, the various components of controller 120 are implemented as modules.

Fluorescence assay device controller 300 is operable to control fluorescence assay device 110 (e.g., by sending fluorescence assay device control information 122 to fluorescence assay device 110). Accordingly, fluorescence assay device controller 300 is operable to manage the functions of the various controllable portions of fluorescence assay device 110 (e.g., light sources, heaters, fluid control mechanisms such as valves and pumps, detectors, etc.). Fluorescence assay device controller 300 is further operable to receive measured fluorescence data 112 and cause it to be stored in datastore 310 as corresponding datapoints. In various embodiments, fluorescence assay device controller 300 includes a fluorescence data analysis module 302 that is operable to perform any of a number of analyses on measured fluorescence data 112 (e.g., statistical analysis to determine a coefficient of variation) and store the results as corresponding datapoints. As discussed herein, analyses may be performed on a per-well, per-bead region, per-analyte, and/or per-reporter basis (e.g., median fluorescence intensity detected for analyte A by reporter B).

Datastore 310 is any suitable computer memory or memories operable to store information related to one or more fluorescence assays. In various embodiments, datastore 310 is provided by one or more a magnetic storage memories or solid-state memories, although any suitable storage device may be used. Datastore 310 is operable to store information relating to apparatus 100 itself (e.g., a system model name, system operation system version) and calibration and verification information for fluorescence assay device 110. Datastore 310 is also operable to store results from previously performed and pending fluorescence assays including a per-receptacle data 312, per-well data 314, and per-analyte data 316. In embodiments where fluorescence assay device 110 is operable to perform a multiplexing assay on a plurality of individual samples, per-receptacle data 312 includes information about the receptacle used to contain the samples (e.g., the number of wells in the microplate, the manufacturer of the microplate). Per-well data 314 includes information about individual wells and what is contained therein (e.g., whether a well is an "unknown" well being tested for analytes or whether a well is a "background" or "control" well used as baselines for analysis, an identifier of the sample such an alphanumeric code) and information about the results of the a fluorescence assay performed on the sample in the well (e.g., the temperature of the sample). In various embodiments, per-well data 314 fluorescence assay information about a sample in a particular well is further broken down by bead region (e.g., total number of beads in a particular region detected in the sample). Per-analyte-data 316 is per-well-data 314 that has further been broken down by individual analyte (e.g., a coefficient of variation for beads tagged with an individual analyte in a particular well). In various embodiments, per-analyte data 316 may be further broken down by reporter (e.g., first detector 230, second detector 240) and/or by channel (e.g., a group of wavelengths of emitted fluorescence such as a red channel, an orange channel etc.). Table 1 below is a non-limiting list of examples of datapoints that may be stored in datastore 310 and may be selected for display on user interface 130 in alphanumeric form in first region 132 or represented in pictographic form in second region 134.

TABLE 1

Examples of Datapoints

| Datapoint | New Group | Description |
| --- | --- | --- |
| System model name | System metadata | System model name |
| Instrument serial number | System metadata | Instrument serial number |
| Any applicable software/ firmware version numbers | System metadata | Any applicable software/ firmware version number(s) |
| Operating System version | System metadata | Operating System version |
| Operating System code | System metadata | Operating System code |
| Overall calibration/ verification state at the time of acquisition | Calibration data, per-well | Were the most recent calibration and verifications performed prior to the well- acquisition successful |

TABLE 1-continued

Examples of Datapoints

| Datapoint | New Group | Description |
|---|---|---|
| Lot number | N/A | N/A - the calibration kit is expected to have only a single reagent, so there should not be a unique KIT lot number or expiration |
| Expiration date | N/A | N/A - the calibration kit is expected to have only a single reagent, so there should not be a unique KIT lot number or expiration |
| Expiration status at the time of execution | N/A | N/A - the calibration kit is expected to have only a single reagent, so there should not be a unique KIT lot number or expiration |
| | Verification data, per-well, per-kit | Verification kit lot number |
| | Verification data, per-well, per-kit | Verification kit expiration date |
| | Verification data, per-well, per-kit | Verification kit expiration status at the time of execution |
| Date/time of last attempted execution | Calibration data, per-well, per-reagent | Date/time of most recent calibration attempt prior to the well-acquisition |
| Pass/fail status of last attempted execution | Calibration data, per-well, per-reagent | Pass/fail status of most recent calibration attempt prior to the well-acquisition |
| Reagent lot number | Calibration data, per-well, per-reagent | Calibration reagent lot number used in the most recent calibration attempt prior to the well-acquisition |
| Reagent expiration | Calibration data, per-well, per-reagent | Expiration date of the calibration reagent lot used in the most recent calibration attempt prior to the well-acquisition |
| Expiration status at the time of execution | Calibration data, per-well, per-reagent | Expiration status of the calibration reagent used in the most recent calibration attempt prior to the well-acquisition |
| Target values | Calibration data, per-well, per-reagent | Target values of the calibration reagent used in the most recent calibration attempt prior to the well-acquisition |
| Any applicable quantitative results, including Count, CV, Mean | Calibration data, per-well, per-reagent | Relevant quantitative results of the most recent calibration attempt prior to the well-acquisition |
| Date/time of last attempted execution | Verification data, per-well, per-reagent | Date/time of most recent calibration attempt prior to the well-acquisition |
| Pass/fail status of last attempted execution | Verification data, per-well, per-reagent | Pass/fail status of most recent verification attempt prior to the well-acquisition |
| Reagent lot number | Verification data, per-well, per-reagent | verification reagent lot number used in the most recent verification attempt prior to the well-acquisition |
| Reagent expiration | Verification data, per-well, per-reagent | Expiration date of the verification reagent lot used in the most recent verification attempt prior to the well-acquisition |
| Expiration status at the time of execution | Verification data, per-well, per-reagent | Expiration status of the verification reagent used in the most recent verification attempt prior to the well-acquisition |
| Target values | Verification data, per-well, per-reagent | Target values of the verification reagent used in the most recent verification attempt prior to the well-acquisition |
| Any applicable quantitative results, including Count, CV, Mean | Verification data, per-well, per-reagent | Relevant quantitative results of the most recent verification attempt prior to the well-acquisition |
| Plate name | Per-plate data | Plate name |
| Plate start time/date | Per-plate data | Time/date of start of acquisition of the 1st acquisition attempt on the 1st well of the plate |
| Plate end time/date | Per-plate data | Time/date of the final acquisition (or reacquisition) of the last well of the plate |
| Description | Per-plate data | I don't think this is still needed; we should allow users to add robust comments to Protocols, but not to plate |

TABLE 1-continued

Examples of Datapoints

| Datapoint | New Group | Description |
|---|---|---|
| Operator initiating the acquisition | Per-plate data | Name of the operator who initiated the 1st acquisition attempt on the 1st well of the plate |
| Type (384/96) | Per-plate data | Type (384/96) |
| User-supplied plate type/ description (ex. 'Millipore 96-well filter plate") | Per-plate data | User-supplied plate type/ description (ex. 'Millipore 96-well filter plate') |
| Plate heater temp/status | Per-well data | Plate heater actual temperature at the time of well acquisition |
|  | Per-well data | Plate heater target temperature |
| Acquisition volume | Per-well data | Acquisition volume |
| Tags | Per-well data | Tags |
| Start time/date | Per-well data | Time/date of the start of the well acquisition (or reacquisition) |
|  | Per-well data | Total time to reach minimum bead count for all regions (or final timeout value) |
|  | Per-well data | True/False for whether the well timed-out |
| DD gate range(s) | Per-well data | Low DD gate |
|  |  | High DD gate |
| Panel name(s) | Per-well data | Panel name |
| Well address (A1-H12) | Per-well data | Well address (A1-H12) |
| Total Events | Per-well data | Total Events |
| Total Gated Events | Per-well data | Total Gated Events |
| Total Classified Events (including out-of-panel regions) | Per-well data | Total Classified Events (including out-of-panel regions) |
| Total Region Events (only in-panel regions) | Per-well data | Total Region Events (only in-panel regions) |
| One or more Sample ID values | Per-well data | Sample ID |
| Ambient/laser temp | Per-well data | Ambient/laser temp |
| Replicate ID | Per-well data | Well ID (U1, S2, etc) |
| Well Type (Control, Standard, Unknown, Background; Positive Control, Negative Control) | Per-well data |  |
| DD-Low: number of events falling below the lowest DD gate | Per-well data | A ratio of events falling below the low DD gate vs. gated events |
| DD-High: number of events falling above the highest DD gate | Per-well data | A ratio of events falling above the high DD gate vs. gated events |
| Messages/Errors during well acquisition | Per-well data | Messages/Errors during well acquisition |
| Well status (successfully acquired, acquired with errors, acquired with warnings, etc.) | Per-well data | Well status (successfully acquired, acquired with errors, acquired with warnings, etc.) |
| Dilution | Per-well data | Dilution |
| Peak events/second | Per-well data | Peak events/second |
| Count status (all regions met/did not meet minimum count) | Per-well data | Count status (all regions met/did not meet minimum count) |
| Time to reach minimum count | Per-region data | Time to reach minimum count |
| Bead count | Per-region data | Final bead count per-region |
| Count status (did/did not reach minimum count) | Per-region data | Count status (individual region did/did not meet minimum count) |
|  | Per-region data | Minimum per-region bead count specified by panel |
| % CV of Count-per-Analyte ("did all regions count similar beads, or did each region's count widely vary?") | Per-region data | % CV of Count-per-Analyte ("did all regions count similar beads, or did each region's count widely vary?") |
| Leading analyte (1st analyte to reach minimum count) | Per-region data | Leading analyte (1st analyte to reach minimum count) |
| Trailing analyte (last analyte to reach minimum count) | Per-region data | Trailing analyte (last analyte to reach minimum count) |
| One or more values indicating position of the center of a given bead group within its region | Per-region data | One or more values indicating position of the center of a given bead group within its region: quantitative measurement of how users currently assess position of a bead group |
| One or more values indicating bead dispersion in CL channels, within region | Per-region data | One or more values indicating bead dispersion in CL channels, within region |
| Is/is not normalization bead | Per-region data | Is/is not normalization bead |
|  |  | Normalization value |

TABLE 1-continued

Examples of Datapoints

| Datapoint | New Group | Description |
|---|---|---|
| Ratio between Reporter 1/Reporter2 | Per-region data | Ratio between Reporter 1/Reporter2 |
| Coefficient of Variation (% CV) | Per-analyte, per-reporter channel data | % CV |
| Trimmed % CV | Per-analyte, per-reporter channel data | Trimmed % CV |
| Standard Deviation | Per-analyte, per-reporter channel data | Standard Deviation |
| Trimmed Standard Deviation | Per-analyte, per-reporter channel data | Trimmed Standard Deviation |
| % CV of Replicates | Per-analyte, per-reporter channel data | % CV of Replicates |
| Median | Per-analyte, per-reporter channel data | Median |
| Net Median | Per-analyte, per-reporter channel data | Net Median (requires calculation of background-subtract values) |
| Net Average Median | Per-analyte, per-reporter channel data | Net Average Median (requires calculation of background -subtract values) |
| Net Normalized Median | Per-analyte, per-reporter channel data | Net Normalized Median (requires calculation of background -subtract values and intra-well normalization) |
| Net Normalized Average Median | Per-analyte, per-reporter channel data | Net Normalized Average Median (requires calculation of background - subtract values and intra-well normalization) |
| Mean | Per-analyte, per-reporter channel data | Mean |
| Trimmed Mean | Per-analyte, per-reporter channel data | Trimmed Mean |
| Peak | Per-analyte, per-reporter channel data | Peak |
| Trimmed Peak | Per-analyte, per-reporter channel data | Trimmed Peak |
| | Per-analyte CL1, CL2, and CL3 data | % CV |
| | Per-analyte CL1, CL2, and CL3 data | Median |
| | Per-analyte CL1, CL2, and CL3 data | Mean |
| | Per-analyte CL1, CL2, and CL3 data | Peak |

User interface controller 320 is operable to control user interface 130 (e.g., by sending user interface information 124 to fluorescence assay device 110) and to receive user input 136 from user interface 130. In various embodiments, user interface control 320 is operable to access records stored in datastore 310 and generate portions of user interface 130 (e.g., regions 132, 134) using such records. For example, user interface controller 320 is operable to access records stored on datastore 310 that correspond to a calculated coefficient of variation for a particular analyte and control user interface 130 to represent such records in alphanumeric form in first region 132 and pictographically in second region 134.

In various embodiments, user interface controller 320 includes one or more user configurations 330 (e.g., stored in one or more configuration files) including first region configurations 332 and second region configurations 334. In various embodiments, first region configuration 332 is indicative of commands from a user specifying which of the information in datastore 310 to represent in first region 132. In some embodiments, first region configuration 332 includes indications of different subsets of information to represent in first region 132 in response to user input 136 (e.g., toggling on or off a particular type of data using controls in third region 410 shown in FIG. 4). In various embodiments, first region configuration 332 includes indications of selection that a user has made from among available to datapoints (e.g., the datapoints shown in Table 1) to be represented in first region 132 in various states (e.g., in a default view state, in states in which various subsets of data have been toggled on or off, in states in which some subsets have been toggled off and other subsets are shown in an expanded view).

In various embodiments, second region configuration 334 is indicative of commands from a user about how particular datapoints should be pictographically represented in second region 134. As discussed in further detail in reference to FIG. 4, second region 134 is usable to display pictographic representations that indicate categorizations of values of the particular set of datapoints for the one or more samples, wherein the pictographic representations are selected according to user-specified categorization criteria. In such embodiments, second region configuration 334 is indicative of these categorization criteria (e.g., a value <20 is represented with a red circle, a value between 20 and 40 is represented with a green square, and value above 40 is represented with a blue triangle). In some embodiments, second region configuration 334 is indicative of a type of graph or plot in which such pictographic representations are displayed (e.g., displayed as a series of icons that indicate spatial relationships between different samples in different well on a microplate, displayed in a histogram or bar chart, displayed as line graph or a dot plot).

Figure 4:
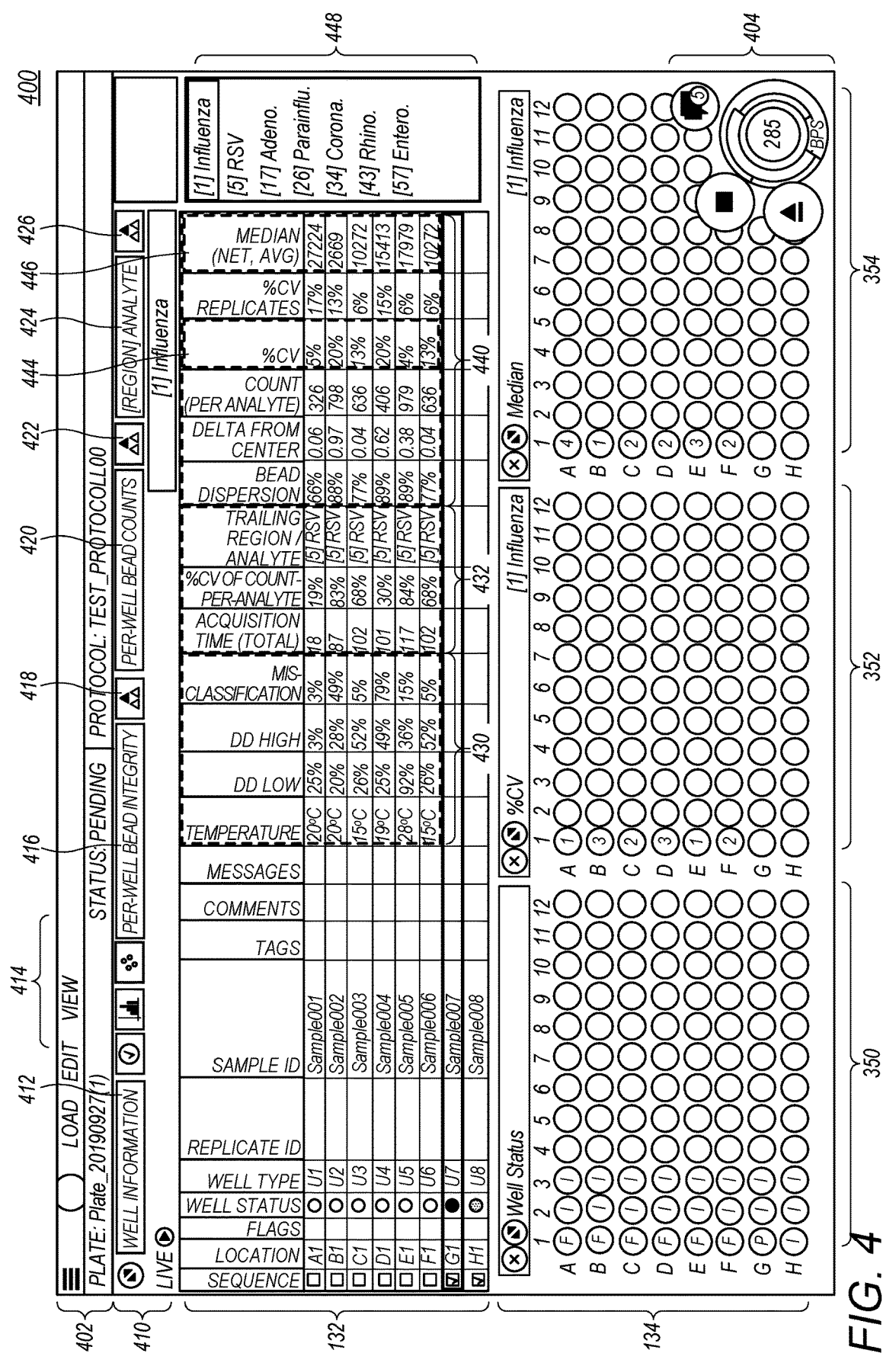

In various embodiments, user interface controller 320 includes a user interface layout module 322 that is operable to insert the various datapoints discussed herein into one or more preexisting layouts that, for example, define the position and orientation on user interface 130 of first region 132 and second region 134 (e.g., with first region 132 appearing above second region 134) as well as various other elements of user interface 130 (e.g., the third region 410 and various other elements depict in FIG. 4).

Referring now to FIG. 4, an example screen 400 of an implementation of user interface 130 is shown in accordance with various embodiments. Example screen 400 depicts a "current run" screen in which information from an on-going fluorescence assay (e.g., a fluorescence assay that is being performed by fluorescence assay device 110) is represented. However, the same user interface could also be used to represent information from one or more completed assays. In the embodiment shown, screen 400 includes first region 132 and second region 134 as well as a control bar 402, a pending assay control region, and a third region 410.

In various embodiments, control bar 402 include a plurality of user interface controls and displays of information relating to file system, editing, and view functions of user interface 130. Using control bar 402, for example, a user define, select, and execute an assay to be performed on a sample; load data from a previous assay; input a command to change user interface 130 to show a historical run display; and input a command to export selected datapoints.

In various embodiments, instrument control region 404 is operable to display status information about an ongoing fluorescence assay and to receive user commands to control the operation of fluorescence assay device 110 during the ongoing fluorescence assay. In the embodiment shown in FIG. 4, instrument control region 404 includes an "eject" button to cause fluorescence assay device 110 to eject the receptacle containing the samples, a "stop" button operable to stop or pause the ongoing assay, and a "messages" button operable to display event messages for the ongoing assay. In various embodiments, instrument control region 404 shows a scanning rate for the ongoing assay (e.g., 285 beads-per-second (BPS) shown in FIG. 4).

In various embodiments, first region 132 is operable to display alphanumeric representations of a subset of datapoints (e.g., datapoints stored in datastore 310) in a table in which individual samples correspond to rows and individual types of datapoints correspond to columns as shown in FIG. 4. It will be understood, however, that other orientations could be used (e.g., datapoints correspond to rows and samples correspond to samples). As shown in FIG. 4, first region 132 includes a "sequence" column, a "location" column, a "flags" column, a "well status" column, a well type column, a replicate ID and sample ID column, and columns usable to represent tags, comments, and messages applied to the samples. In the embodiment shown in FIG. 4, first region 132 also includes a subregion 430 corresponding to datapoints relating to per-well bead integrity, a subregion 434 corresponding to datapoints relating to per-well bead counts, and a subregion 440 corresponding to datapoints relating to information corresponding to a particular bead region (represented in FIG. 4 by the numbers in brackets) and a particular analyte (e.g., a genetic sequence for influenza). As shown in FIG. 4, a dark box highlights the row corresponding to Sample007, which in the embodiment shown indicates that Sample007 is currently being assayed.

In various embodiments, the "sequence" column is operable to receive user input 136 to toggle whether a particular sample in a receptable should be assayed. As shown in FIG. 4, the first six rows are unchecked because the corresponding samples have already been assayed. If the box in the "sequence" column for the row corresponding to Sample008 were unchecked, then Sample008 would not be assayed. If, for example, user interface 130 indicated to a user that there may be issue with the on-going assay, the user may opt to command apparatus 100 to skip certain samples (e.g., by unchecking one or more boxes) to adjust the performance of the assay.

In various embodiments, the "location" column is operable to display an indicator of the location of a particular sample within a receptacle (e.g., a particular well on a microplate). As discussed here, this indicator of location is used to associate the various other datapoints to the particular portion of the receptacle corresponding to the sample and to show the spatial representation of the various samples in various graphical representations in second region 134. For example, Sample001 is located in well A1 of the receptacle, which corresponds to the icon in the top left of subregions 350, 352, and 354 in second region 134, Sample001 is located in well B1 which is directly below well A1 in subregions 350, 352, and 354 in second region 134, etc.

In various embodiments, the "well status" column represents whether a well has been assayed, is currently being assayed, will be assayed in the ongoing assay, or will be skipped. In the embodiment shown in FIG. 4, this status is indicated pictographically with icons that vary be color and/or by shape (e.g., a green circle for an assayed well, a purple circle for the well currently being assayed, a teal circle for a well that will be assayed, and a grey circle for a well that will be skipped). The well-status column corresponds to the pictographic representation in subregion 350 discussed below.

In various embodiments, subregion 430 is useable to display a subset of datapoints relating to per-well bead integrity. Such datapoints relate to, for example, information such as well temperature, percentages of measurements that were passed by the doublet discrimination gates (e.g., DD low and DD high percentages) during measurement to in an effort to filter out measurements of two or more beads from single-bead measurements, and a misclassification percentage. In various embodiments, the datapoints represented in subregion 430 are selected (e.g., by a user) from among the various "per-well-data" datapoints discussed herein (e.g., the "per-well-data" rows in Table 1), and this selection is recorded in first region configuration 332. As discussed herein, subregion 430 can be toggled on and off the display in response to user selection of the "per-well bead integrity" control 416. In some embodiments, subregion 430 can be modified from a first set of "per-well-data" datapoints to a different set of "per-well-data" datapoints in response to user selection of the "per-well bead integrity" control 416.

In various embodiments, subregion 432 is useable to display a subset of datapoints relating to per-well bead counts. Such datapoints relate to, for example, acquisition time in seconds, a coefficient of variation of counts per-analyte, and trailing region/analyte. In various embodiments, the datapoints represented in subregion 432 are selected (e.g., by a user) from among the various "per-well-data" datapoints discussed herein (e.g., the "per-well-data" rows in Table 1), and this selection is recorded in first region configuration 332. As discussed herein, subregion 432 can be toggled on and off the display in response to user selection of the "per-well bead counts" control 420. In some embodiments, subregion 432 can be modified from a first set of "per-well-data" datapoints to a different set of "per-well-data" datapoints in response to user selection of the "per-well bead counts" control 420.

In various embodiments, subregion 440 is useable to display a subset of datapoints relating to a particular region and an analyte associated with that region. Such datapoints relate to, for example, bead dispersion, delta from center, count per analyte, coefficient of variation (for that [Region] Analyte), coefficient of variation for replicates, and median (net, avg). In various embodiments, the datapoints represented in subregion 440 are selected (e.g., by a user) from among the various "per region" and/or "per-analyte" datapoints discussed herein (e.g., the "per-region data" and/or "per-analyte, per-reporter channel data" rows in Table 1), and this selection is recorded in first region configuration 332. The particular [Region] Analyte represented in subregion 440 may be selected by the user in the list 448. In various embodiments, subregion 440 can be toggled on and off the display in response to user selection of the "[Region] Analyte" control 424. In some embodiments, subregion 440 can be modified from a first set of "per region" and/or "per-analyte" datapoints to a different set of "per region" and/or "per-analyte" datapoints in response to user selection of the "[Region] Analyte" control 424.

As discussed herein, various portions of first region 132 are selectable by the user in various embodiments. In response to a user selection, these selected portions may be pictographically represented in second region 134. For example, in the embodiment shown in FIG. 4, portion 444 of subregion 440 corresponding to coefficient of variation for [1] Influenza is selected and subregion 352 of second region 134 pictographically represents the coefficient of variation for [1] Influenza. Similarly, portion 446 of subregion 440 corresponding to median (net, avg) for [1] Influenza is selected and subregion 354 of second region 134 pictographically represents the median (net, avg) for [1] Influenza.

Second region 134 is operable to display pictographic representations of particular datapoints (e.g., datapoints stored in datastore 310) in a one or more graphical subregions (e.g., subregions 350, 352, 354) as shown in FIG. 4. While three subregions 350, 352, and 354 are shown in FIG. 4, second region 134 may be operable to display fewer or more subregions. In some embodiments, if more then three sets of datapoints are selected to be pictographically represented, additional subregions may be generated but not displayed on screen 400. In some of such embodiments, these additional subregions may be displayed as a result of user input (e.g., a left-to-right scrolling gesture on a touch-screen that causes the subregions 350 and 352 to be transposed to the right and subregion 354 to be hidden and an additional subregion to be displayed where subregion 350 previously was displayed) In other embodiments, the various subregions are scrolled through automatically (e.g., the subregions scroll continually or after a period of time has elapsed).

As discussed herein, subregion 350 pictographically represents the datapoints that are represented in the "well status" column in first region 132, subregion 352 pictographically represents the datapoints that are represented in portion 444 of subregion 440 corresponding to coefficient of variation for [1] Influenza, and subregion 354 pictographically represents the datapoints that are represented in portion 446 of subregion 440 corresponding to median (net, avg) for [1] Influenza. Various datapoints that are represented in various other columns in first region 132 may be pictographically represented in second region 134 as additional subregions.

In various embodiments, the pictographic representations of subregions 350, 352, and 354 include one or more respective icons that represent respective individual ones of the one or more samples. In the embodiments shown in subregions 350, 352, and 354, the respective icons correspond to individual wells in a 96-well microplate. As discussed herein, individual samples are contained in various individual wells, and the various circles represent these individual wells, and—in instances where a sample is contained in the well—the samples (e.g., in the embodiment shown in FIG. 4 wells A4 through H12 do not contain a sample). Accordingly, the pictographic representations shown in subregions 350, 352, and 354 indicate a spatial arrangement of the one or more samples in the receptacle. In various instances, the icons of the pictographic representations (e.g. the circles in subregions 350, 352, and 354) are updated as an ongoing assay is performed (e.g., a subregion 350 indicates well status with changing colors, the icons shown in subregion 352 and 354 are grey until the collection of data for that well is completed then the a particular icon representing a completed well is updated to pictographically represent the corresponding datapoint). In various embodiments, user interface 130 is operable to reduce the size of first region 132 and increase the size of second region 134. For example, first region 132 (and in embodiments third region 410) may be hidden and second region 134 may be displayed larger using the surface area previously used to display first region 132 (and in embodiments third region 410). In another example, first region 132 may be reduced in size such that only the column header and the row corresponding to the sample currently being assayed is shown and the second region 134 is increased in size.

In the embodiment shown in FIG. 4, subregion 350 pictographically represents whether a well has been scanned. In various embodiments, this pictographic representation is done with colored icons. Icons marked "F" for "finished" in FIG. 4 may be colored green, the icon marked "P" for "pending" may be colored purple, and the icons marked "I" for "incomplete" may be colored teal. But any other colors may be used, as well as different shapes. In various embodiments, the icons do not include numbers or letters, and instead depict the categorizations by color and/or shape of the icons. The choice of colors and shapes to use, for example, may be determined by user selections.

In the embodiment shown in FIG. 4, subregions 352 and 352 pictographically particular sets of per-analyte datapoints as discussed herein. In various embodiments, this pictographic representation is done with colored icons. In subregion 352, for example, icons marked "1" correspond to values of coefficient of variation for [1] Influenza of <10% and may be colored light green, icons marked "2" correspond to values of coefficient of variation for [1] Influenza of between 10%-15% and may be colored dark green, and icons marked "3" correspond to values of coefficient of variation for [1] Influenza of <15% and may be colored red. Similarly, in subregion 354, icons marked "1" correspond to values of median (net, avg) for [1] Influenza of <5000 and may be colored light green, icons marked "2" correspond to values of median (net, avg) for [1] Influenza of between 5000-15000 and may be colored dark green, icons marked "3" correspond to values of median (net, avg) for [1] Influenza of between 15000-2000 and may be colored dark red, and icons marked "4" correspond to values of median (net, avg) for [1] Influenza of between >20000 and may be colored bright red. In various embodiments, the icons do not include numbers or letters, and instead depict the categorizations by color and/or shape of the icons. The choice of colors and/or shapes to use and the threshold defining categorizations may be determined by user selections in various embodiments.

Third region 410 includes a plurality of controls that are user selectable to cause datapoints to be represented in first region 132 and/or second region 134. In the embodiment shown in FIG. 4, third region 410 includes "well information" control 412, "per-well bead integrity" control 416, "per-well bead counts" control 420, and "[Region] Analyte" control 424 which are selectable to adjust the datapoints represented in first region 132. Additionally, in various embodiments third region 410 includes pictographic representation controls 414, 418, 422, and 426. In such embodiments, control 414 is operable to adjust the pictographic representation in subregion 350 between a spatial representation, a histogram, and a dot plot. Controls 418, 422, and 426 are toggles that enable or disable pictographic representation of datapoints corresponding to per-well bead integrity, per-well bead counts, and [region] analyte, respectively.

As discussed herein, the various regions of user interface 130 are configurable to allow a user to highlight important datapoints and prominently display them on user interface 130. This may allow a user, for example, to determine that there is an issue with an ongoing assay and input on or more commands to adjust the performance of the assay. In some instances, the command may be to cancel the assay altogether, but in other embodiments the user may pause the assay and perform on the following actions and then resume the assay: (a) perform a physical, off-instrument process on one or more samples such as repeating some biochemical portion of the assay preparation process, (b) performing some type of maintenance on apparatus 100 (e.g., cleaning or calibrating components, adjusting lenses or filters, etc.), and/or (c) adjusting the performance of controller 120 by, for example, modifying an acquisition parameter (changing a timeout or sample uptake volume value, or reconfiguring the acquisition to alter which bead regions are included).

Through the use of the various controls and selectable icons shown in FIG. 4, a user is able to configure screen 400 to provide alphanumeric and pictographic representations of various datapoints that may be important to a particular experiment, and cause the user interface to highlight (e.g., with the different categorizations of pictographic representations) distinctions between various datapoints that may be important to the experiment. In various embodiments, the pictographic representations and alphanumeric representations of a set of datapoints are displayed on user interface 130 at the same time such that during an experiment, a user can see information represented pictographically and then view the same information in more detail represented in alphanumeric form (e.g., a series of colored dots represents categorizations of the coefficient of variation for a particular analyte, and the underlying numbers used to determine the categorizations are both shown on user interface 130). Moreover, such a user interface 130 may be more assessable (e.g., to color-blind users) who can select different colors or shapes that the user fines easier to perceive. Further, through the use of the "carousel" feature of second region 134, a user is able to display any number of pictographic representations and scroll through them manually or set them to automatically scroll so the user can more easily watch the experiment from a distance (e.g., by observing the pictographic representations). If the user determines there might be an issue with the fluorescence assaying being perform, the user is able to adjust the performance of the assay in various ways to address the issue or to cancel the assay and start over as appropriate.

Figure 5:
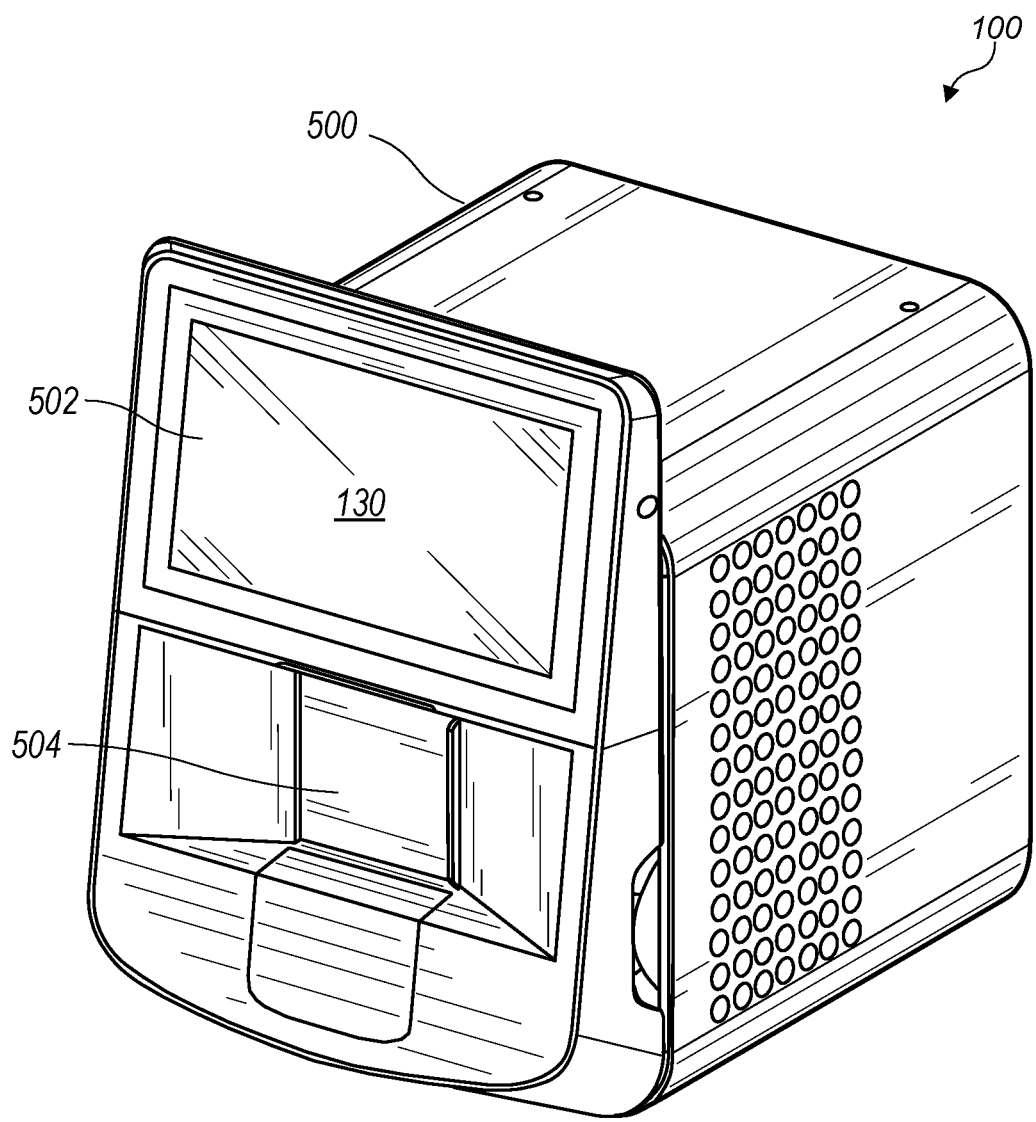
FIG. 5 is a perspective view of an embodiment of the apparatus or claim 1 in accordance with various embodiments.

Referring now to FIG. 5, a perspective view is shown of an embodiment of apparatus 100 in accordance with various embodiments. In the embodiment shown in FIG. 5, apparatus 100 is contained inside a case 500. In this embodiment, fluorescence assay device 110 and controller 120 are disposed within case 500 and user interface 130 is presented on a display 502. In various embodiments display 502 is a touchscreen display operable to implement user interface 130 including the various display regions, icons, etc. shown in FIG. 4 and receive commands from a user. In various embodiments discussed here, user interface 130 is operable to receive a command to export datapoints from apparatus 100 to a second computer system. Case 500 includes an opening 504 into which a user can set a receptacle containing one or more samples. In various embodiments, an apparatus 100 as shown in FIG. 5 is sized to fit on a desktop. In some embodiments, for example, such an apparatus 100 is 58.4 cm (23 in) wide, 61 cm (24 in) deep, 76.2 cm (30 in) tall. In such embodiments, display 502 is 363.8 mm (14.3 in) wide and 215.9 mm (8.5 in) tall with a 396.24 mm (15.6 in) viewing area, measured diagonally.

As discussed herein, in various embodiments, such receptables include but are not limited to 96-well plates (also referred to as "microplates" or "microtiter plates"). In various embodiments, such microplates may be made of various materials (e.g., polystyrene) and may transparent, translucent, or opaque and in various colors. Once the receptacle is placed in opening 504, during a fluorescence assay, the fluorescence assay device 110 is configured to draw respective samples from respective wells into fluorescence assay device 110, illuminate the respective samples, and measure fluorescence emitted by fluorescent materials in the respective samples as discussed herein.

Figure 6:
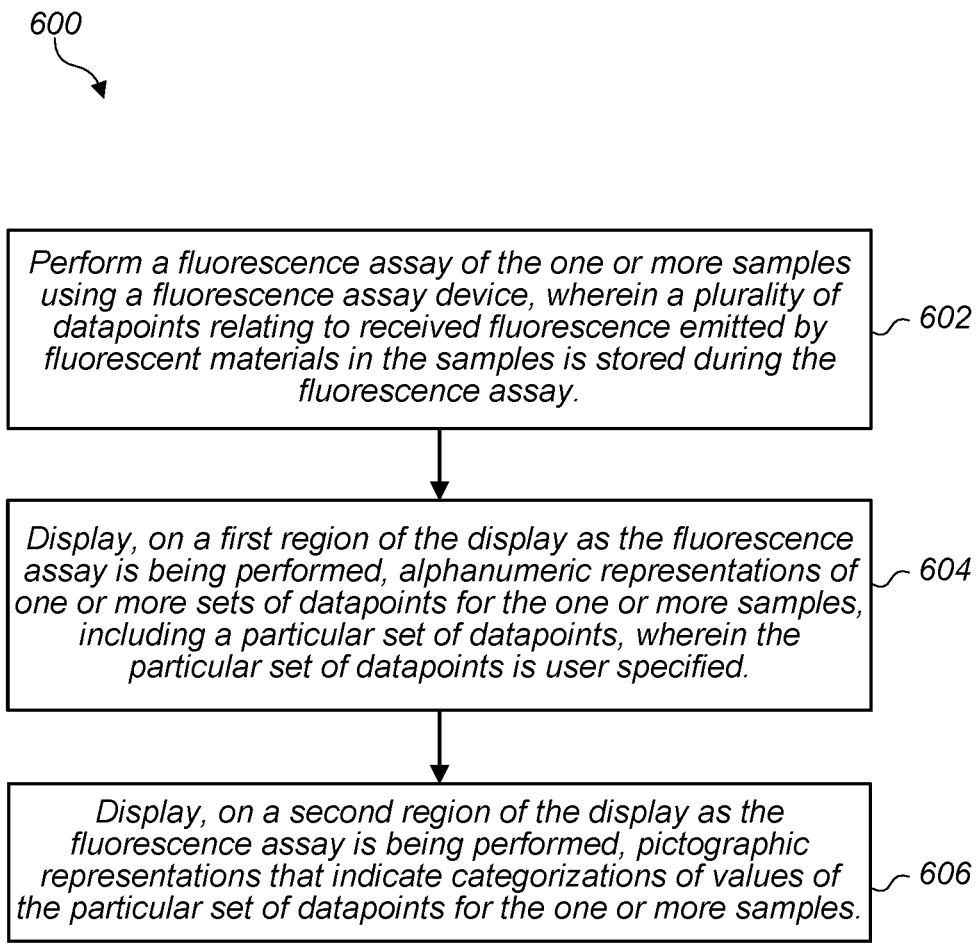
FIG. 6 is a flowchart illustrating an embodiment of a user interface method in accordance with the disclosed embodiments.
Figure 7:
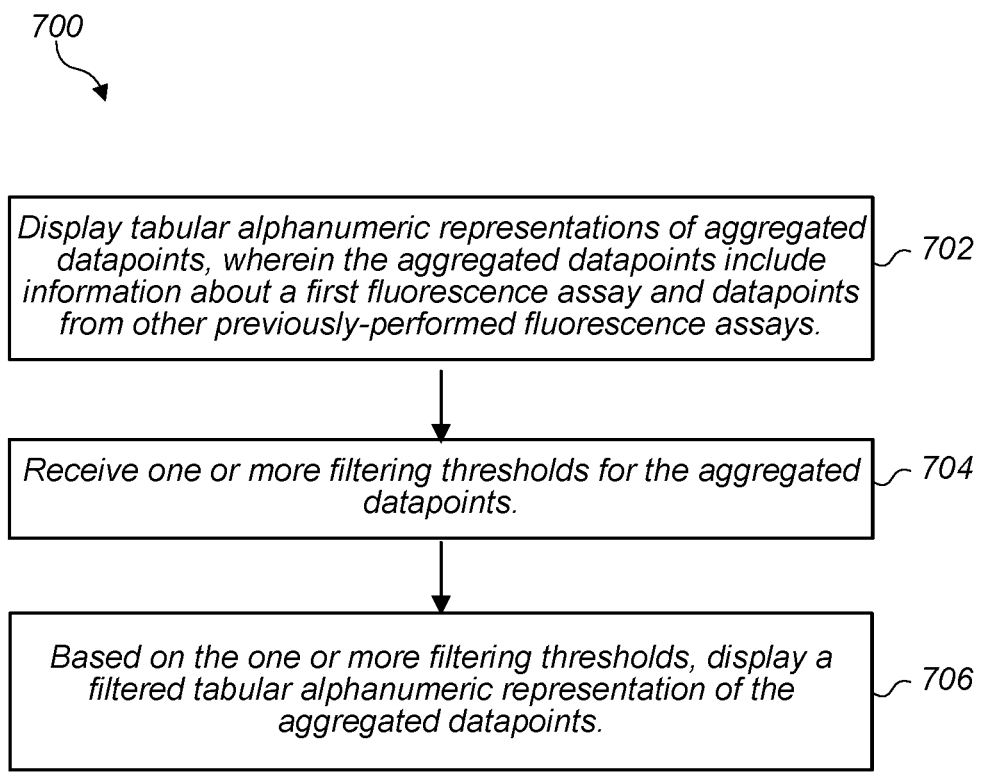
FIG. 7 is a flowchart illustrating an embodiment of a user interface method in accordance with the disclosed embodiments.

FIGS. 6 and 7 illustrate various flowcharts representing various disclosed methods implemented with controller 120 and user interface 130. Referring now to FIG. 6, a flowchart depicting a current run user interface method 600 is shown. In the embodiment shown in FIG. 6, the various actions associated with method 600 are implemented by controller 120 and user interface 130 during an ongoing fluorescence assay.

At block 602, an apparatus 100 performs a fluorescence assay of the one or more samples using a fluorescence assay device 110. During the fluorescence assay, a plurality of datapoints relating to received fluorescence emitted by fluorescent materials in the samples is stored (e.g., by controller 120 in datastore 310). At block 604, as the fluorescence assay is being performed, a user interface 130 displays alphanumeric representations of one or more sets of datapoints for the one or more samples in first region 132, including a particular set of user-specified datapoints. At block 606, as the fluorescence assay is being performed, a user interface 130 displays pictographic representations that indicate categorizations of values of the particular set of datapoints for the one or more samples in second region 132. In various embodiments, the pictographic representations are selected according to user-specified categorization criteria.

Referring now to FIG. 7, a flowchart depicting a historical view user interface method 600 is shown. In the embodiment shown in FIG. 7, the various actions associated with method 600 are implemented by controller 120 and user interface 130 after a plurality of fluorescence assays have been performed.

At block 702, user interface 130 displays tabular alphanumeric representations of aggregated datapoints. The aggregated datapoints include information about a first fluorescence assay (e.g., a fluorescence assay that was ongoing during method 600) and datapoints from other previously-performed fluorescence assays. At block 704, user interface 130 receives one or more filtering thresholds for the aggregated datapoints. At block 706, based on the one or more filtering thresholds, user interface 130 displays a filtered tabular alphanumeric representation of the aggregated datapoints.

Exemplary Computer System

Figure 8:
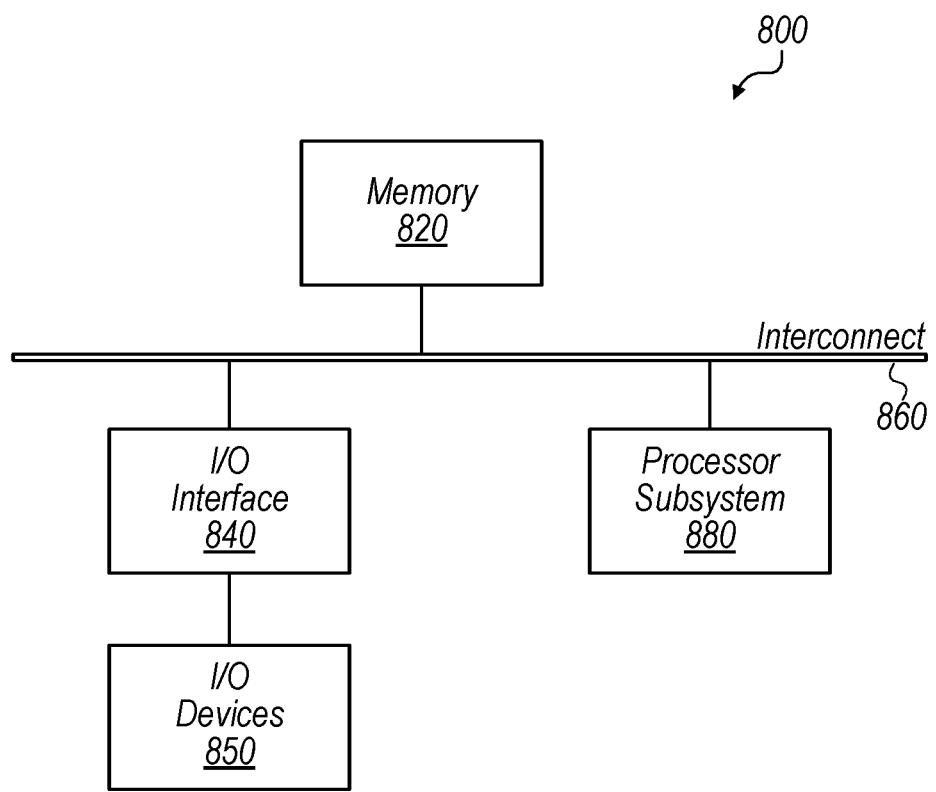
FIG. 8 is a block diagram of an exemplary computer system, which may implement the various components of FIGS. 1 and 3.

Turning now to FIG. 8, a block diagram of an exemplary computer system 800, which may implement the various components of apparatus 100 (e.g., controller 120, user interface 130) is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, or a computer system that is integrated into an apparatus 100 with a fluorescence assay device 110. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable to store program instructions executable by processor subsystem 880 to cause system 800 perform various operations described herein. System memory 820 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via an I/O device 850 (e.g., a network interface device configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus comprising:
    a fluorescence assay device including:
        a sample receiver configured to hold a receptable including one or more samples, wherein the one or more samples include particles having a plurality of fluorescent materials;
        a plurality of light sources configured to illuminate the sample; and
        a plurality of photosensors configured to receive fluorescence emitted by the fluorescent materials;
    a display;
    a computer processor circuit; and
    a computer memory circuit storing instructions that when executed by the computer processor circuit cause the apparatus to perform operations including:
        performing a fluorescence assay of the one or more samples using the fluorescence assay device, wherein a plurality of datapoints relating to received fluorescence emitted by the fluorescent materials is stored during the fluorescence assay;
        displaying, on a first region of the display as the fluorescence assay is being performed, alphanumeric representations of one or more sets of datapoints for the one or more samples, including a particular set of datapoints, wherein the particular set of datapoints is user specified; and
        displaying, on a second region of the display as the fluorescence assay is being performed, pictographic representations corresponding to categorizations of values of the datapoints for the one or more samples in the particular set of datapoints, wherein the pictographic representations indicate the categorizations of the values of the datapoints determined according to user-specified categorization criteria, the user-specified categorization criteria defining particular pictographic representations to represent particular categories for the values of the datapoints.

2. The apparatus of claim 1, wherein the operations further include:
receiving from a user one or more commands that adjust performance of the fluorescence assay being performed.

3. The apparatus of claim 1,
wherein the pictographic representation includes one or more respective icons that represent respective individual ones of the one or more samples; and
wherein the respective icons indicate a spatial arrangement of the one or more samples in the receptacle.

4. The apparatus of claim 1, wherein the operations further include:
receiving, using the first region of the display, a user selection of the particular set of datapoints;
receiving, using the display, a user selection of a format for the pictographic representation; and
receiving the user-specified categorization criteria.

5. The apparatus of claim 1, wherein the operations further include:
receiving results of previously-performed fluorescence assays of previous samples, wherein the results include a plurality of datapoints relating to received fluorescence emitted by the previous samples and metadata about the previous samples;
displaying, on the display, tabular alphanumeric representations of the results;
receiving one or more filtering thresholds for the plurality of datapoints and/or metadata; and
based on the one or more filtering thresholds, displaying, on the display, a filtered tabular representation of the results.

6. The apparatus of claim 5, wherein the operations further include:
receiving a selection of datapoints and metadata displayed in the filtered tabular representation; and
preparing the selected datapoints and metadata for export to a remote computer system.

7. A method comprising:
receiving, at a computer system, information about a fluorescence assay of one or more samples including particles having a plurality of fluorescent materials, wherein the information includes a plurality of sets of datapoints relating to received fluorescence emitted by the fluorescent materials;
generating, with the computer system, a first region of a user interface, wherein the first region includes alphanumeric representations of a first subset of the plurality of sets of datapoints for the one or more samples, including one or more particular sets of datapoints, wherein the one or more particular sets of datapoints is user specified; and
generating, with the computer system, a second region of the user interface including:
a plurality of pictographic representations corresponding to categorizations of values of the datapoints for the one or more samples in the one or more particular sets of datapoints, wherein the plurality of pictographic representations indicates the categorizations of the values of the datapoints determined according to user-specified categorization criteria, the user-specified categorization criteria defining particular pictographic representations to represent particular categories for the values of the datapoints, and
a pictographic representation control useable by a user to select which of the plurality of pictographic representations is displayed in the second region.

8. The method of claim 7,
wherein, during the generating of the first and second regions of the user interface, the fluorescence assay is ongoing;
wherein the plurality of pictographic representations indicates a progress of the ongoing fluorescence assay and data collected during the ongoing fluorescence assay;
the method further comprising:
receiving, with the computer system, one or more commands that adjust performance of the fluorescence assay.

9. The method of claim 8, wherein the one or more commands that adjust performance includes one or more modifications to acquisition parameters for the fluorescence assay.

10. The method of claim 7, further comprising:
in response to one or more user commands, reducing a size of the first region within the user interface and increasing a size of the second region within the user interface.

11. The method of claim 7, wherein the computer system is a component of a fluorescence assay device that is operable to perform the fluorescence assay;
the method further comprising:
displaying, on a display of the fluorescence assay device, the user interface; and
in response to one or more user commands, exporting a portion of the information to a second computer system.

12. The method of claim 7, further comprising:
generating, with the computer system, a third region of the user interface, wherein the third region includes one or more controls useable by the user to change the first subset of the plurality of sets of datapoints displayed in the first region to a second, different subset of the plurality of sets of datapoints.

13. The method of claim 12, further comprising:
receiving, at the computer system from the user, one or more commands specifying which of the information to include in the first subset and the second subset.

14. The method of claim 7, wherein the fluorescence assay includes a multiplex assay for detecting a plurality of analytes in the one or more samples, wherein the particles includes a plurality of groups of particles, and wherein particles in individual ones of the groups of particles have (i) one or more characteristic fluorescence parameters that distinguish the particles of one of the groups of particles from those of another of the groups of particles, and (ii) a reactant specific for an analyte from among the plurality of analytes.

15. The method of claim 7,
wherein the computer system is a component of a fluorescence assay device that is operable to perform the fluorescence assay using a plurality of light sources; and
wherein the information includes one or more measurements of fluorescence emitted by the plurality of fluorescent materials as a result of being illuminated by one or more of the plurality of light sources.

16. The method of claim 7,
wherein the computer system is a component of a fluorescence assay device that is operable to perform the fluorescence assay; and
wherein the one or more samples are contained by a receptacle including a plurality of wells, wherein the fluorescence assay includes drawing respective samples from respective wells into the fluorescence assay device, illuminating the respective samples, and measuring fluorescence emitted by fluorescent materials in the respective samples.

17. The method of claim 16,
wherein the plurality of pictographic representations includes a plurality of respective icons that represent individual ones of the plurality of wells; and
wherein the respective icons indicate a spatial arrangement of the respective samples contained in the respective individual ones of the plurality of wells.

18. A non-transitory, computer-readable medium storing instructions that when executed by a computer system cause the computer system to perform operations comprising:
receiving, at a computer system, information about a first fluorescence assay of one or more samples including particles having a plurality of fluorescent materials, wherein the information includes a plurality of sets of datapoints relating to received fluorescence emitted by the fluorescent materials;
while the first fluorescence assay is being performed, displaying with the computer system a first user interface that is operable to:
display, on a first region of the first user interface as the fluorescence assay is being performed, alphanumeric representations of one or more sets of datapoints for the one or more samples, including a particular set of datapoints, wherein the particular set of datapoints is user specified; and
display, on a second region of the first user interface as the fluorescence assay is being performed, a first set of pictographic representations corresponding to categorizations of values of the datapoints for the one or more samples in the particular set of datapoints, wherein the first set of pictographic representations indicate the categorizations of the values of the datapoints determined according to user-specified categorization criteria, the user-specified categorization criteria defining particular pictographic representations to represent particular categories for the values of the datapoints; and
after the first fluorescence assay has been performed, displaying with the computer system a second user interface that is operable to:
display tabular alphanumeric representations of aggregated datapoints, wherein the aggregated datapoints includes the information about first fluorescence assay and datapoints from other previously-performed fluorescence assays;
receive one or more filtering thresholds for the aggregated datapoints; and
based on the one or more filtering thresholds, display a filtered tabular alphanumeric representation of the aggregated datapoints.

19. The non-transitory, computer-readable medium of claim 18, wherein first user interface is further operable to:
display, on the second region of the first user interface, a second set of pictographic representations that indicate categorizations of values of a different set of datapoints for the one or more samples.

20. The non-transitory, computer-readable medium of claim 18, wherein the second user interface is further operable to:
receive a selection of a datapoints displayed in the filtered tabular alphanumeric representation; and
cause the selected datapoints to be exported to a remote computer system.

\* \* \* \* \*